United States Patent
Schmidt et al.

(10) Patent No.: US 7,493,681 B2
(45) Date of Patent: Feb. 24, 2009

(54) MACHINE TOOL

(75) Inventors: Klaus Schmidt, Seebach (DE); Ines Prautzsch, Tabarz (DE)

(73) Assignee: Deckel Maho Seebach GmbH, Seebach (DE)

( * ) Notice: Subject to any disclaimer, the term of this patent is extended or adjusted under 35 U.S.C. 154(b) by 550 days.

(21) Appl. No.: 11/248,566

(22) Filed: Oct. 11, 2005

(65) Prior Publication Data

US 2006/0078397 A1   Apr. 13, 2006

(30) Foreign Application Priority Data

Oct. 11, 2004   (DE) ................ 10 2004 049 525

(51) Int. Cl.
*B23C 1/14* (2006.01)
*B23Q 1/01* (2006.01)
*B23B 39/00* (2006.01)

(52) U.S. Cl. ............... 29/26 A; 29/33 P; 409/168; 409/235

(58) Field of Classification Search ............ 409/163, 409/165, 168, 197, 198, 219, 221, 222, 223, 409/224, 235; 29/26 A, 33 P, 34 B, 38 A, 29/38 B, 56.5; 408/234, 237
See application file for complete search history.

(56) References Cited

U.S. PATENT DOCUMENTS

| 3,822,959 | A | * | 7/1974 | Tabard ............... 408/89 |
| 3,998,127 | A | * | 12/1976 | Romeu ............... 409/225 |
| 4,630,509 | A |   | 12/1986 | McLean |
| 4,644,635 | A |   | 2/1987 | Murai et al. |
| 4,664,570 | A | * | 5/1987 | Tsukiji et al. ........... 409/84 |
| 4,705,438 | A | * | 11/1987 | Zimmerman et al. ..... 409/132 |
| 4,712,282 | A | * | 12/1987 | Romeu ............... 29/27 C |
| 5,172,464 | A | * | 12/1992 | Kitamura et al. ......... 29/563 |
| 5,611,137 | A | * | 3/1997 | Braun ................ 29/560 |
| 5,669,867 | A |   | 9/1997 | Hoppe |
| 5,909,988 | A | * | 6/1999 | Hoppe et al. ........... 409/198 |
| 6,679,659 | B1 | * | 1/2004 | Lasch et al. ........... 409/235 |
| 6,948,894 | B2 | * | 9/2005 | Taga et al. ........... 409/235 |
| 7,179,030 | B2 | * | 2/2007 | Krosta et al. .......... 409/235 |
| 7,220,087 | B2 | * | 5/2007 | Sugata et al. ......... 409/132 |
| 2001/0015117 | A1 | * | 8/2001 | Hoppe ............... 82/117 |

FOREIGN PATENT DOCUMENTS

| DE | 35 90 093 T1 | 6/1986 |
| DE | 100 06 897 A1 | 6/2001 |
| EP | 0 721 819 A1 | 7/1995 |

* cited by examiner

*Primary Examiner*—Dana Ross
(74) *Attorney, Agent, or Firm*—The Maxham Firm

(57) ABSTRACT

A machine tool, and in particular a milling and drilling machine, which includes a rigid base on which an inclined support surface pointing forward and upward is formed. The support surface forms a support for a workpiece support rotatable about the central axis and comprises a support supported on the support surface and rotatable about its central axis. A workpiece table is provided on a bent support portion of the support. The axis of the workpiece table forms an acute angle with the central axis of the support surface. The support surface is laterally offset with respect to the vertical central plane of the base so that its central axis forms an acute angle with the vertical central plane of the base, and the workpiece table assumes a forward tilted posture in intermediate positions within a rotational angle range.

12 Claims, 3 Drawing Sheets

MACHINE TOOL

BACKGROUND OF THE INVENTION

1. Field of the Invention

The invention relates to a machine tool, and in particular to a milling and drilling machine comprising a rigid base on which an inclined support surface directed forward/upward is formed. The machine further includes at least one workpiece support rotatable about the central axis of the support surface, and a support supported on the support surface that is rotatable about its central axis.

2. Discussion of the Related Art

EP 0 721 819 B1 discloses a known milling and drilling machine for machining a workpiece in a plurality of axes. This machine comprises a machining unit shiftable along coordinate axes on a rigid machine column by means of a motor and included vertical spindle head. The front surface of the machine includes a column recess, the bottom of which extends forward and upward by 45° and serves as a support surface for the support of a workpiece support. The support is rotatable about the central axis of the support surface, which is inclined by 45°. As viewed from above, the support comprises a circular foot and a support shoulder formed integrally therewith. A support surface formed on the support shoulder is inclined by 45° with respect to the rotational axis of the support, and serves as a support surface for a workpiece table. The workpiece table may be formed as a round table rotatable about its central axis by means of a motor.

The column recess and its bottom extend forward and upward by 45°. The column recess and the workpiece support are rotatably supported thereon and are disposed on the machine column in its vertical central plane. By rotating the workpiece support about its central axis on the support surface, the workpiece table can be rotated into a horizontal machining and clamping position, a vertical position, and an intermediate position. The workpiece support can be fixed in each of these positions so that a clamped workpiece can be machined, by means of the vertical spindle, in a plurality of axes. However, no back surface undercuts may be produced with this machine.

Other machine tools comprise workpiece supports rotatably disposed on a surface inclined by 45° are, for example, disclosed in DE 3 590 093 T and U.S. Pat. No. 4,644,635. On these machines, the workpiece table can also be moved from a horizontal position into a vertical position by means of a motor. This allows the clamped workpiece to be machined vertically and horizontally.

SUMMARY OF THE INVENTION

It is an object of the invention to provide a machine tool, and in particular a milling and drilling machine having an extended machining area that enables back surface undercuts on a workpiece.

According to an embodiment of the invention, the support surface may be disposed so that it extends obliquely forward and upward. The support surface serves as a support for the workpiece support, and is laterally offset with respect to the vertical central plane of the base so that its central axis forms an acute angle with the vertical central plane of the base. The workpiece table assumes a posture in which it is tilted forward in an intermediate position within a rotational angle range.

A machine tool designed in accordance with an embodiment of the invention includes a workpiece table that can be moved into a vertical position or an intermediate position from a horizontal position. This may be accomplished by rotating the workpiece support, that is, the base including the workpiece table, about the central axis of the laterally offset, inclined support surface. The workpiece table may be accurately and stably fixed in each of these positions by a suitable fixation means. Examples of such fixation means include clamping elements, centering studs, and/or position controlled motors.

In the horizontal and vertical positions, work can be carried according to the techniques described in EP 0 721 819 B1. The advantages of this known milling and drilling machine, over conventional machine types, include the convenient accessibility of the work space and the stable support of the workpiece. The stable support of the workpiece is due to the large bearing surface of the base on the support surface. The present invention also provides such advantages, and well as providing the possibility to move the workpiece table, within a predetermined rotational angle range, into a forward tilted posture in which the back surface of clamped workpieces can be machined by means of a simple vertical spindle. This may be accomplished without the need of a pivotable head and allows, for example, undercuts to be produced in the workpiece.

According to an alternative embodiment of the invention, the angle between the central axis of the support surface, which forms the rotational axis of the workpiece support, and the axis of the workpiece table in the vertical plane extending through the central axis, is greater than 45° in a predetermined range. A certain maximum degree of overhang of the workpiece table is determined by this angle. The degree of the lateral offset of the workpiece support, and the inclined spatial orientation of its central axis, are also determined in accordance with this angle.

To increase productivity, another embodiment of the invention includes two workpiece supports that are provided on two inclined support surfaces. The support surfaces may be disposed on both sides of the vertical central plane of a base. This allows a workpiece to be clamped to the second workpiece table while another one is machined.

BRIEF DESCRIPTION OF THE DRAWING

The above and other aspects, features, and advantages of the present invention will become more apparent upon consideration of the following description of preferred embodiments, taken in conjunction with the accompanying drawing figures, wherein.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

Figure 1:
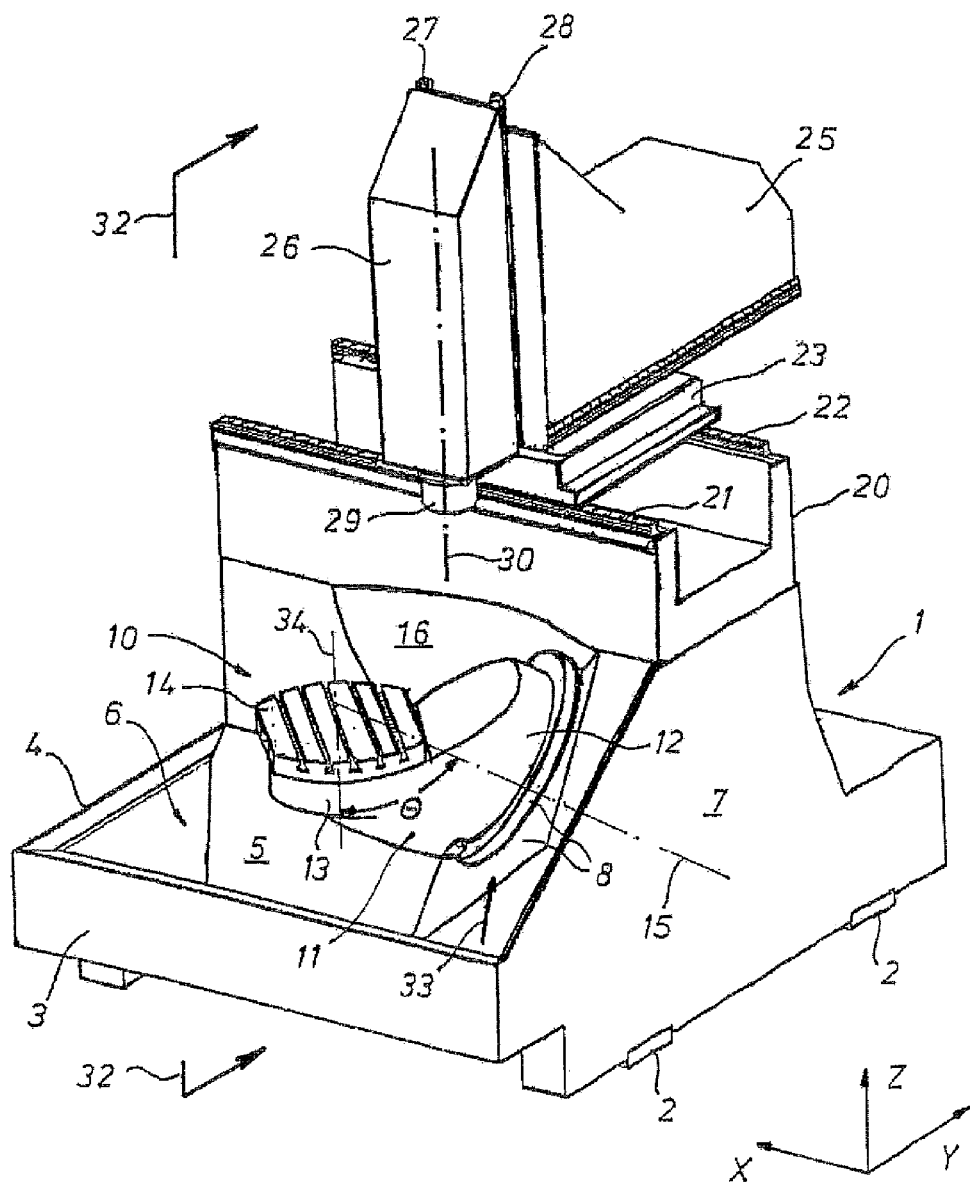
FIG. 1 is a perspective view of a milling and drilling machine.

The universal milling and drilling machine shown in FIG. 1 comprises rigid base 1 resting on the floor or foundation via feet 2. On the front side of base 1, pan 6 is used for collecting chips and machining liquids and is defined by side walls 3, 4 and an inclined rear wall 5. According to FIG. 1, the pan is defined by an inclined, forward and upward pointing support surface 8 at its right side, which forms a support for a workpiece support. Support surface 8 is formed laterally offset with respect to vertical central plane 32 of base 1 and oriented so that its spatially obliquely extending central axis 15 forms an acute spatial angle θ with a vertical longitudinal plane, such as vertical central plane 32.

Workpiece support 10 comprises support 11 that includes circular foot 12 and bent support member 13 integrally formed thereon. Workpiece table 14 being mounted on the upper side of support member 13. The workpiece table may be formed as a rotationally driven round table. Circular foot 12 of support 11 is extensively supported on support surface 8 of base 1. The circular foot is rotatable about central axis 15 of the support surface 8. Support foot 12 extends in the acute spatial angle θ by means of a motor so that workpiece support 10 can be rotated about its axis 15 in both directions of rotation. Support 11 can be fixed in any rotational position with respect to support surface 8 by a suitable fixation means (not shown), such as latches, clamping elements, position controlled electric motors, and the like. Rounded front recess 16 enables collision-free rotation of workpiece support 10 about central axis 15. The rounded front recess is shown in FIG. 1 as formed on the face of base 1, and in particular, the left side of inclined support surface 8.

According to the milling and drilling machine shown in FIG. 1, support 20 is shown having a U-shaped cross section mounted on base 1 and guide rails 21, 22. The guide rails are mounted on each of the two upper legs of support 20. Slide 23 is shown positioned on guide rails 21, 22. The slide supports housing 25, which is shiftable along the Y-axis and is supported so that it is movable along the X-axis. Machining unit 26 is shown located on the vertical face of housing 25. The machining unit comprises driven work spindle 29. The work spindle has a vertical spindle axis 30, and is shiftable along vertical guides 27, 28. Vertical spindle head 26 may alternatively be implemented using a horizontal spindle, or pivotable heads comprising a pivotable work spindle.

Figure 2:
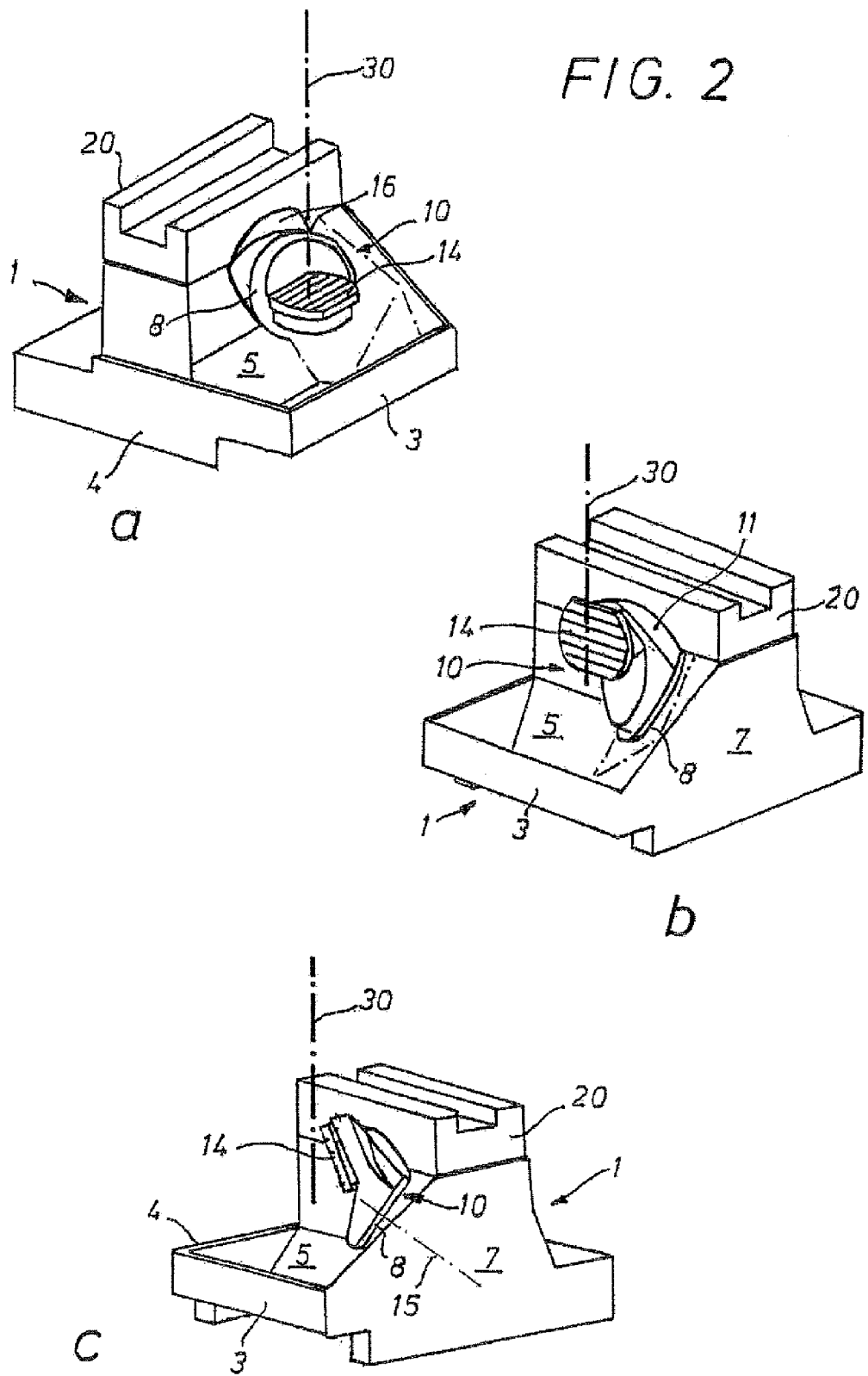
FIGS. 2a-2c show the base of a milling and drilling machine, as well as a workpiece support, in various operating positions.

FIGS. 2a, 2b, and 2c show base 1, and included column 20 and workpiece support 10, in various perspective views. Workpiece table 14 is shown located in different positions in these figures. According to FIG. 2a, the workpiece table is disposed in a horizontal basic position, such as that shown in FIG. 1. The workpiece table may contain workpieces that can be machined by means of vertical spindle 29. Spindle axis 30 is indicated by a broken line. As shown in FIGS. 1 and 2a, the clamping grooves in workpiece table 14 do not usually extend parallel to the X- or Y-axes, but instead extend at acute angles relative to these axes. When rotationally driven round table 14 is used, the conventional table position with the clamping grooves extending parallel to the X-coordinate axis, as well as any other position of the workpiece table, can be obtained by rotating table 14 about table axis 34.

FIG. 2b shows a second basic position of workpiece support 10. In this figure, the workpiece support is rotated about its axis 15 at a predetermined angle on inclined support surface 8 so that workpiece table 14 is disposed in a vertical position. As shown in FIG. 2b, workpiece table 14 may be rotated about its axis 34 so that its clamping grooves are oriented in the direction of the X-axis. By rotating workpiece table 14 in this manner, all sides of a clamped workpiece can be conventionally machined with a tool inserted in the vertical work spindle.

Workpiece support 10, along with workpiece table 14, may be rotated about its rotational axis 15 by 180°. Such movement rotates horizontal workpiece table 14 from the basic position shown in FIG. 2a into the position shown in FIG. 2c where workpiece table 14 and the clamped workpiece (not shown) are moved into a tilted position. A tool clamped in the vertical work spindle, indicated by its axis 30, can produce back surface undercuts in this table position. The undercuts can be produced on each side of the workpiece by rotating the workpiece table about its central axis 34. This effect is achieved by an interaction of the lateral offset of workpiece support 10 and the special inclined orientation of its rotational axis 15.

Figure 3:
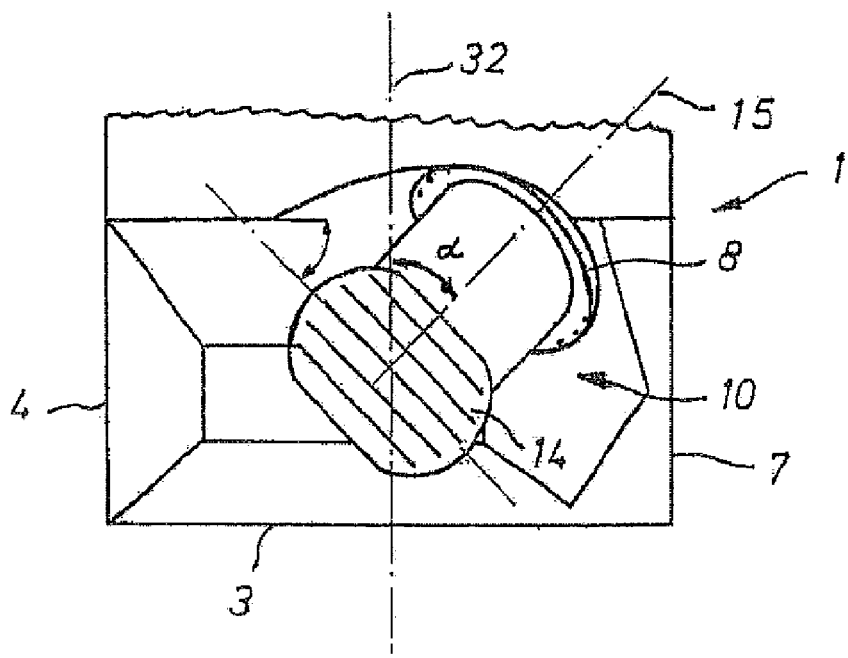
FIG. 3 is a schematic top view of the base of a milling and drilling machine and the workpiece support.
Figure 4:
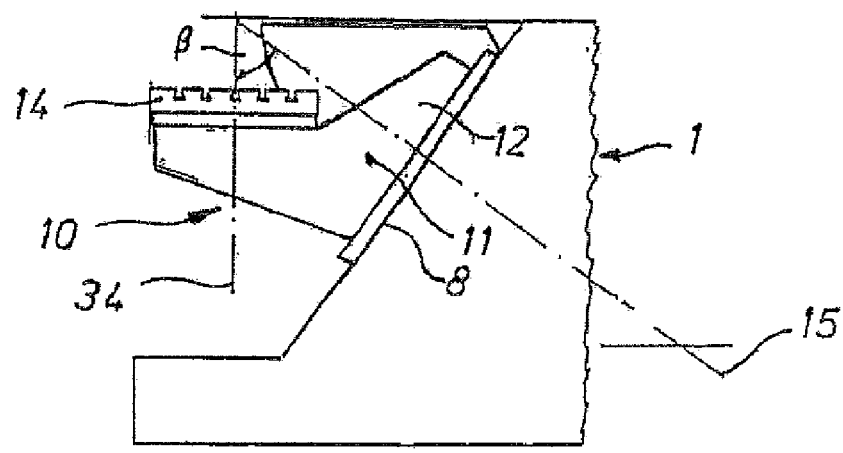
FIG. 4 is a schematic side view of the workpiece support.

In the schematic views of FIGS. 3 and 4, the angles for the embodiment of FIG. 1 are shown in more detail. In these figures, workpiece table 14 is shown in its horizontal basic position. In FIG. 3, angle α between vertical central plane 32 and rotational axis 15 of workpiece support 10, determines that the lateral offset of the workpiece support 10 is about 45° in the plane of the drawing.

FIG. 4 is a schematic side view of workpiece support 10 in a direction parallel to the oblique surface 8 of base 1. That is, the workpiece table is shown in the horizontal basic position in the direction of arrow 33 in FIG. 1. In the illustrated embodiment, the workpiece support is formed so that angle β between its rotational axis 15 and rotational axis 34 of workpiece table 14 is 55°. The selection and interrelated adjustment of the two angles α and β determine the tilting degree of workpiece table 14.

A particular advantage of an embodiment of invention is the relatively large workspace also existing in the intermediate position of workpiece table 14, as shown in FIG. 2c. This results from the laterally offset position of support surface 8, with respect to central plane 32, and its functional connection with the inclined orientation of workpiece support 10. Further it is advantageous that milling head 26 moves only along one axis during the machining of the workpiece in the positions of workpiece support 10 shown in, for example, FIG. 2c.

The invention is not limited to the illustrated embodiment. The inclined table arrangement according to the invention may also be used for so-called bed machines in which at least one workpiece support is provided on a machine bed which can be regarded as a part of the machine base. The inclined support surface forms support for the rotatable workpiece support. The inclined support surface has a central axis serving as the rotational axis for the workpiece support and forms an acute spatial angle with a vertical longitudinal plane of the machine bed. The inclined support surface may be arranged on the machine bed or a column so that it is laterally offset with respect to the vertical central plane of the machine with a correspondingly adjusted oblique orientation of its central axis. Such a column may also be shiftable on the machine bed in corresponding guides. Furthermore, two workpiece supports described in detail above may be formed on a base, preferably on both sides of the vertical central plane.

The technical concept of the invention may also be applied to machining units of a milling and drilling machine comprising a milling or spindle head. In such an embodiment, a spatially inclined support surface corresponding to inclined support surface 8 of the machine described above is formed on a vertical or horizontal slide or headstock guided on the machine column. The inclined support surface is shiftable along at least one coordinate axis. The inclined support surface supports a support that is rotatable about its central axis.

The central axis of the support surface extends in a spatial angle θ with respect to a vertical plane. A spindle head is provided on a bent front or side portion of the support, opposite of the inclined support surface. The spindle head includes a rotationally driven work spindle. The vertical and horizontal orientation of the work spindle as well as a plurality of spatially inclined spindle positions, are obtained by a suitable selection and interrelated adjustments of the spatial angle. Such positioning provides, for example, for the production of back surface undercuts. The advantage compared to known fork heads is the substantially higher overall rigidity due to the extensive support of the pivotable head on the inclined support surface, which consequently enables high machining performance and accuracy.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed only with reference to the claims.

What is claimed is:

1. A machine tool, comprising:
   a rigid base on which an inclined support surface pointing forward and upward is formed;
   at least one workpiece support rotatable about a central axis of the support surface, the at least one workpiece support comprising a first support supported on the support surface and rotatable about the central axis, and a workpiece table disposed on a bent support element of the first support and movable into a horizontal basic position and a vertical basic position by rotating the workpiece support; and
   at least one machining unit shiftable along coordinate axes and including an exchangeable tool; wherein
   the support surface is laterally offset with respect to a vertical central plane of the base so that the central axis forms an acute spatial angle θ with a vertical longitudinal plane of the base, and that the workpiece table assumes a forward tilted position in intermediate positions within a rotational angle range; and wherein
   the workpiece support is structured so that an angle (β) between the central axis of the support surface and a central axis of the workpiece table is greater than 45°.

2. The machine tool according to claim 1, wherein the angle (β) is adjusted together with an angle (α) to obtain a desired degree of tilting, the angle (α) being defined as an angle between the vertical central plane of the base and the central axis of the support surface projected into the horizontal plane as determined by lateral offset of the support surface.

3. The machine tool according to claim 2, wherein the workpiece table is structured to be rotationally driven.

4. The machine tool according to claim 2, wherein the base is a machine column comprising a recess provided on its front surface and disposed laterally with respect to the vertical central plane of the base, a bottom of said recess forming at least part of the support surface of the rotatable workpiece support.

5. The machine tool according to claim 2, wherein the base is a machine bed on which at least one workpiece support is fixedly or shiftably provided.

6. The machine tool according to claim 2, further comprising:
   two workpiece supports provided on the base on two inclined support surfaces respectively disposed on both sides of the vertical central plane of the base.

7. The machine tool according to claim 1, wherein the workpiece table is structured to be rotationally driven.

8. The machine tool according to claim 7, wherein the base is a machine bed on which at least one workpiece support is fixedly or shiftably provided.

9. The machine tool according to claim 1, wherein the base is a machine column comprising a recess provided on its front surface and disposed laterally with respect to the vertical central plane of the base, a bottom of said recess forming at least part of the support surface of the rotatable workpiece support.

10. The machine tool according to claim 9, wherein the machine column comprises a slide arrangement shiftable along horizontal coordinate axes (X, Y), and the machining unit including a milling head and a vertical work spindle being mounted on a slide arrangement so as to be shiftable along a vertical coordinate axis (Z).

11. The machine tool according to claim 1, wherein the base is a machine bed on which at least one workpiece support is fixedly or shiftably provided.

12. The machine tool according to claim 1, further comprising:
   two workpiece supports provided on the base on two inclined support surfaces respectively disposed on both sides of the vertical central plane of the base.

* * * * *